United States Patent Office 3,551,938
Patented Jan. 5, 1971

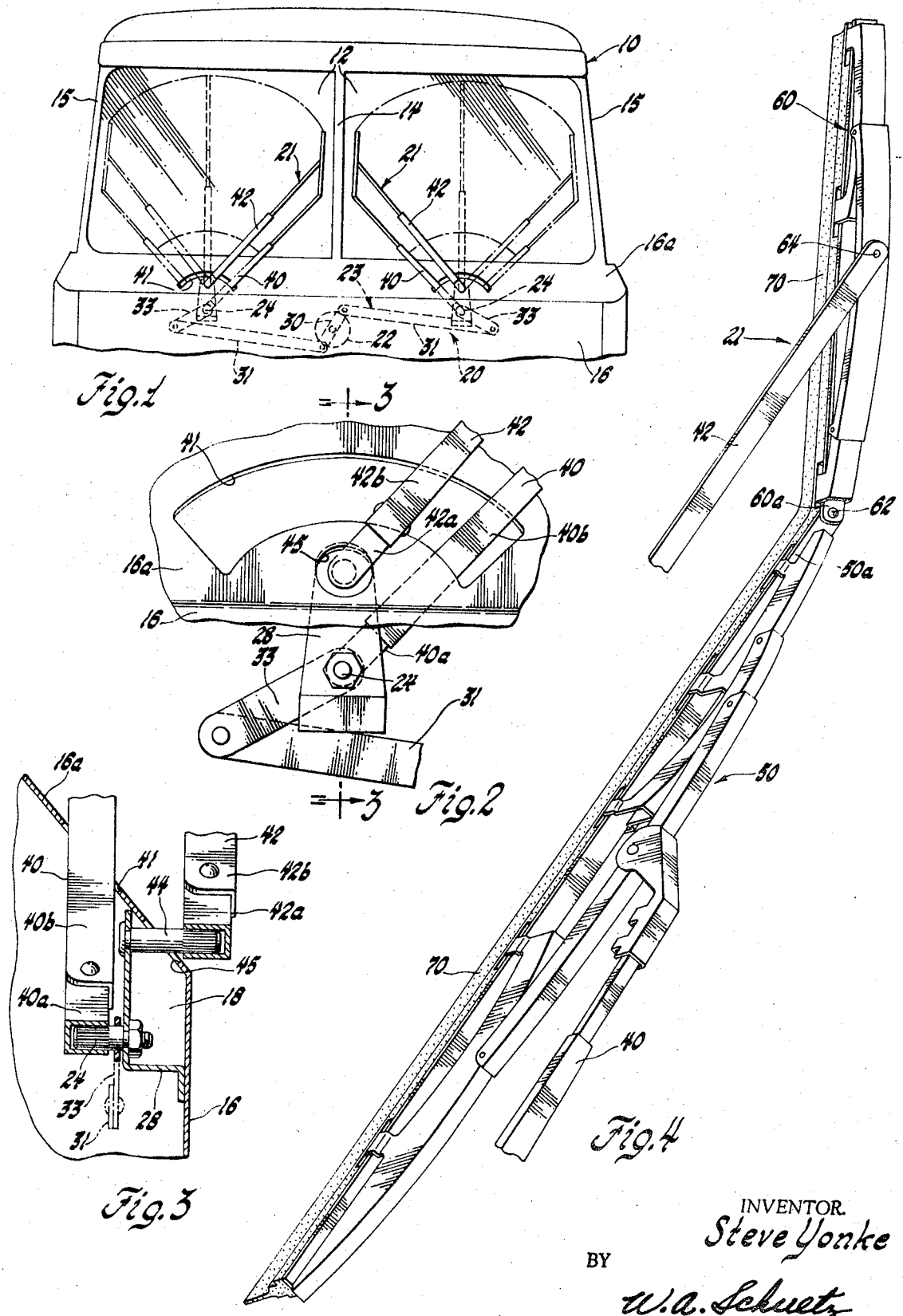

3,551,938
ARTICULATED WINDSHIELD WIPER
FOR FLAT FRONT VEHICLES
Steve Yonke, Union Lake, Mich., assignor to General
Motors Corporation, Detroit, Mich., a corporation of
Delaware
Filed Sept. 4, 1968, Ser. No. 757,367
Int. Cl. B60s 1/32
U.S. Cl. 15—250.23                          2 Claims

ABSTRACT OF THE DISCLOSURE

In a preferred form, an oscillatory windshield wiper for wiping a windshield is disclosed. The windshield wiper comprises a first arm for carrying a first blade holder means and which is adapted to be connected to an oscillatory drive pivot, a second wiper arm pivotally connected to a pivot means at one end and at its other end pivotally connected to a second blade holder means intermediate the ends of the latter, and a pivot means for pivotally interconnecting the first and second blade holder means. The windshield wiper further includes a single wiper blade extending along substantially the entire length of both the first and second blade holder means.

---

The present invention relates to a window wiper, and in particular to a pantograph type windshield wiper for wiping a flat windshield of an automotive vehicle.

Heretofore, pantograph windshield wipers have been provided which included a pair of parallel wiper arms pivotally connected to a single, vertically disposed wiper blade assembly. One of the arms was connected to an oscillatory drive pivot and the other of the arms merely constituted a follower arm for maintaining the wiper blade assembly in a vertical disposition as it was oscillated across the outer surface of the windshield. An average of this type of windshield wiper is that by maintaining the wiper blade assembly in a vertical disposition as it is being oscillated, a relatively wide lateral wipe pattern is achieved, since the blades can be oscillated to a position close and parallel to the posts on the vehicle. Such a wiper is shown in U.S. Pat. No. 2,830,314.

One of the disadvantages of the known pantograph windshield wipers is that while providing for a wide wipe pattern, they do not maximize the area wiped adjacent the lower edge of the windshield at the midportion of the wiper stroke. That is, the area wiped in the central portion of the windshield adjacent the bottom edge is less than that of a conventional oscillatory wiper in which the wipe blade assembly remains aligned with the wiper arm.

In accordance with the provisions of the present invention, a novel windshield wiper is provided in which the major portion of the wide lateral wipe pattern achieved by the known pantograph wipers described above is maintained and yet the area wiped along the midportion of the windshield adjacent its lower edge is increased over the known type of pantograph wipers. The resulting wipe pattern achieved is one in which the areas of the windshield directly in front of the drivers field of vision are substantially wiped and increased over the prior type of pantograph wipers.

Accordingly, it is an object of the present invention to provide a new and improved pantograph type windshield wiper in which the area of the windshield wiped directly in front of the driver is increased over that of the heretofore described known type of pantograph wipers.

Another object of the present invention is to provide a new and improved pantograph windshield wiper for wiping a windshield of an automotive vehicle and which includes a pair of pivotally interconnected blade holder means or assemblies, one of which is carried by one of the wiper arms and the other of which is pivotally connected to the other of the wiper arms intermediate its ends, and a single wiper blade extending along substantially the entire length of both of the blade holder means so as to provide an uninterrupted wipe pattern whose lower edge is closely adjacent the lower edge of the windshield and whose lateral extremities are closely adjacent the posts of the vehicle.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which:

FIG. 1 is a fragmentary front elevational view of a vehicle embodying the novel pantograph windshield wiper of the present invention;

FIG. 2 is an enlarged fragmentary elevational view of part of the apparatus shown in FIG. 1;

FIG. 3 is a fragmentary sectional view taken approximately along line 3—3 of FIG. 2; and FIG. 4 is a fragmentary perspective view of part of the novel pantograph windshield wiper of the present invention.

The present invention provides a novel windshield wiper, and in particular a novel pantograph windshield wiper. Although the pantograph windshield wiper of the present invention could be used for cleaning various windows of automotive vehicles, it is particularly susceptible for use in cleaning flat or planar windows or windshields, such as the flat front windshields of a bus, and for the purposes of description and illustration, it will be herein described as being used for the latter purpose.

Referring to FIG. 1 of the drawings, an automotive vehicle in the form of a bus 10 is there shown. The bus 10 includes a pair of flat or planar windshields 12 mounted in place in any suitable or conventional manner between a common center post 14 and respective end posts 15. The bus 10 also includes a forward end wall or panel 16 having a slopping upper portion 16a. The forward end wall 16 defines with a rearwardly spaced inner wall (not shown) a compartment 18 in which a windshield wiper drive mechanism 20 for oscillating a pair of pantograph windshield wipers 21 is disposed.

The windshield wiper drive mechanism 20 can be of any suitable or conventional construction and is shown in FIG. 1 as comprising a unidirectional drive motor 22, a transmission linkage 23 and a pair of drive pivots 24 pivotally supported for oscillatory movement by a suitable bracket or support panel 28. The bracket 28 is shown in FIG. 3 as being secured to the forward end wall 16 of the bus 10, although it could be secured to any suitable support structure of the vehicle. The drive motor 22, when energized, rotates a crank 30, the opposite ends of the crank being connected via links 31 to crank arms 33, the crank arms 33 in turn being drivingly connected to the drive pivots 24.

The drive motor 22, when energized, functions to oscillate the drive pivots 24 in opposite directions to cause the pantograph wipers 21 to be moved in opposite directions across the outer surface of the windshields 12 between a first or inboard position, as shown by the solid lines in FIG. 1, in which the wipers 21 are located adjacent and parallel or substantially parallel to the center post 14 and a second or outboard position, as shown by the phantom line in FIG. 1, in which the wipers 21 are located adjacent and parallel or substantially parallel to the end posts 15 of the vehicle. The wipers 21 are located in their inboard position when parked.

The pantograph windshield wipers 21 each comprise a first or drive arm 40 having spring hinged connected inner and outer sections 40a and 40b (see FIG. 3) and with the inner section being fixed to the drive pivot 24. The tapered portion 16a of the front wall 16 is provided with an elongated slot 41 through which the wiper arm 40 extends. The wipers 21 further each include a second or follower arm 42 having spring hinged inner and outer sections 42a and 42b. The arm 42 extends parallel to the drive arm 40 and which is pivotally connected at its lower end to the bracket 28 via a pivot pin means 44. The arms 42 extend through openings 45 in the tapered portion 16a of the front wall 16 and the pivot pins 44 are located vertically above the drive pivots 24.

As shown in FIG. 4, the wiper arms 40 each carry a first blade holder means or assembly 50 and with the blade holder means being longitudinally aligned with and movable with the wiper arm 40 when the latter is oscillated. The blade holder means 50 can be of any suitable or conventional construction, such as the blade holder means shown in United States Pat. No. 3,120,675. The blade holder means 50 is pivotally connected at its upper end to the lower end of a second or auxiliary blade holder means 60 by a pivot pin means 62, the pivotal connection being between the adjacent ends of the resilient flexer strips 50a and 60a of the blade holder means 50 and 60. The auxiliary blade holder means 60 likewise can be of any suitable or conventional construction such as that disclosed in the U.S. Pat. No. 3,120,675.

The auxiliary blade holder means 60 are also pivotally connected intermediate their ends to the upper or outer end of the wiper arms 42 by pivot pin means 64. The pivot pin means 64 enables the auxiliary blade holder means 60 to pivot relative to the first blade holder means 50 about an axes extending normal to the plane of the windshield and the follower arms 42 to pivot relative to the auxiliary blade holder means 60 about an axes extending normal to the plane of the windshield.

In accordance with the provisions of the present invention, the blade holder means 50 and 60 carry a single wiper blade 70 extending along the entire or substantially the entire length thereof. That is, a first portion of the blade 70 extends along and is carried by the blade holder means 50 and a second portion extends along and is carried by the blade holder means 60. The wiper blade 70 can be of any suitable cross sectional shape and is retained on the blade holder means 50 and 60 in any suitable or conventional manner.

The wipers 21 when oscillated across the windshield 12 between their first and second positions, as indicated by the solid and phantom lines in FIG. 1, provide a wipe pattern having an arcuate upper edge, an arcuate lower edge, pair of vertical side edge portions extending downwardly from the extremities of the arcuate upper edge and a pair of downwardly converging side edge portions extending from the extremities of the arcuate lower edge to the other ends of the vertical edge surfaces. This wipe pattern or area for each windshield 12 is effected as a result of the wiper blade portion extending along the first blade holder means 50 being moved through an arcuate path and the blade portion extending along the auxiliary blade holder means 60 being moved through an arcuate path while its disposition remains vertical due to the follower arm 42. During this movement the wiper blade 70 will be transversely pivoted or flexed along its portion adjacent the pivotal connection between the first and second blade holder means 50 and 60. It should also be noted that wiper arms 40 and 42, since they are pivoted about axes which are vertically aligned that the follower arm wil be vertically aligned with the drive arm at the midportion of its operative sweep, as shown by the dotted lines in FIG. 1.

The advantages of the novel pantograph wiper of the present invention are that substantially all of the area of the windshield directly in front of the driver is wiped. By providing a single wiper blade which extends along a pair of pivotally interconnected blade holder means, as above described, not only is a wide lateral wipe pattern effected in which the blades are moved closely adjacent and parallel to the posts 12 and 14 at their stroke ends, but also that a greater area of the windshield is wiped adjacent its lower edge as compared to the known pantograph wipers.

Although the illustrated embodiment thereof has been described in great detail, it should be apparent that certain modifications, changes, and adaptations may be made in the illustrated embodiment, and that it is intended to cover all such modifications, changes and adaptations which come within the scope of the appended claims.

What is claimed is:

1. A window wiper for use in wiping a window of an automotive vehicle when oscillated in opposite directions thereacross between first and second positions comprising: a first arm having one end which is adapted to be connected to an oscillatory drive pivot located adjacent a horizontal edge of the window; a second follower arm extending generally parallel to said first arm and having one end which is adapted to be connected to a first pivot means located adjacent said horizontal edge of the window; a first blade holder means carried by said first arm and being movable in an arcuate path with said first arm when said drive pivot is oscillated; a second blade holder means pivotally connected intermediate its ends to the other end of said second arm; second pivot means for pivotally interconnecting said first and second blade holder means at their adjacent ends for movement about an axis extending substantially normal to the plane of the window, said second arm and said second pivot means maintaining said second blade holder means in a generally vertical disposition when said second blade holder means is oscillated in an arcuate path between said first and second positions in response to oscillation of said first arm; and a single flexible wiper blade for engaging the windshield and having first and second portions extending substantially along the entire length of said first and second blade holder means, respectively, said blade at the juncture of said first and second portions being flexed about said axis of said second pivot means as said wiper is oscillated across the window.

2. A pantograph window wiper for wiping a window of an automotive vehicle and which is adapted to be oscillated across the window in opposite directions between first and second positions comprising: a first arm having one end which is adapted to be connected to an oscillatory drive pivot located adjacent the lower horizontal edge of the window, a second follower arm extending generally parallel to said first arm and having one end which is adapted to be connected to a first pivot means located adjacent said lower edge of the window; a first blade holder means carried by said first arm and aligned longitudinally therewith; a second blade holder means pivotally connected intermediate its ends to the other end of said second arm; second pivot means for pivotally interconnecting said first and second blade holder means at their adjacent ends for movement about an axis extending substantially normal to the plane of the window, said second arm and said second pivot means maintaining said second blade holder means in a generally vertical disposition when said wiper is moved in an arcuate path between its first and second positions in response to oscillation of said first arm; and a single flexible wiper blade for engaging the windshield and which extends along substantially the entire length of both of said first and second blade holder means whereby said wiper when oscillated between its first and second positions provides a wipe pattern having arcuately extending upper and lower edges, straight side edge portions which extend vertically downward from the ends of the upper arcuate edge and straight side edge portions whcih converge towards the ends of lower edge proceeding from the other ends of the vertically extending edge portions, said blade adjacent said second pivot means being flexible about said axis of said second pivot means as said wiper is being oscillated across the window.

References Cited

UNITED STATES PATENTS

| | | | |
|---|---|---|---|
| 1,485,919 | 3/1924 | Hein | 15—250.23 |
| 1,694,245 | 12/1928 | Baker et al. | 15—250.23 |
| 2,601,664 | 6/1952 | Nesson | 15—250.42X |
| 2,651,800 | 9/1953 | Picon | 15—250.42 |
| 2,834,038 | 5/1958 | Kramer | 15—250.23 |

ROBERT W. MICHELL, Primary Examiner